(12) United States Patent
Lemmons

(10) Patent No.: US 12,108,110 B2
(45) Date of Patent: Oct. 1, 2024

(54) SYSTEMS AND METHODS FOR CLASSIFICATION AND DELIVERY OF CONTENT

(71) Applicant: Comcast Cable Communications, LLC, Philadelphia, PA (US)

(72) Inventor: Chris David Lemmons, Denver, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 17/664,131

(22) Filed: May 19, 2022

(65) Prior Publication Data

US 2023/0396834 A1 Dec. 7, 2023

(51) Int. Cl.
*H04N 21/439* (2011.01)
*H04N 21/4545* (2011.01)
*H04N 21/845* (2011.01)

(52) U.S. Cl.
CPC ..... *H04N 21/4396* (2013.01); *H04N 21/4394* (2013.01); *H04N 21/45457* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 2002/0007371 A1* | 1/2002 | Bray | ............... | H04N 21/4394 348/E5.122 |
| 2004/0049780 A1* | 3/2004 | Gee | ............... | H04N 21/44008 725/35 |
| 2006/0130119 A1* | 6/2006 | Candelore | ............... | H04N 7/163 725/135 |
| 2006/0277564 A1* | 12/2006 | Jarman | ............... | H04N 21/4396 348/E5.002 |
| 2009/0049467 A1* | 2/2009 | Robson | ............... | H04N 21/4542 725/28 |
| 2012/0216226 A1* | 8/2012 | Humphrey | ............... | H04N 21/8586 725/34 |
| 2014/0200893 A1* | 7/2014 | Vanjani | ............... | H04N 21/4532 704/257 |
| 2015/0003811 A1* | 1/2015 | Kandekar | ............... | G06F 16/48 386/261 |
| 2015/0026734 A1* | 1/2015 | Ellis | ............... | H04N 21/47 725/56 |
| 2015/0245112 A1* | 8/2015 | Whiteing | ............... | H04N 21/233 725/93 |
| 2016/0037217 A1* | 2/2016 | Harmon | ............... | H04N 21/4542 725/9 |

(Continued)

*Primary Examiner* — Alexander Q Huerta
(74) *Attorney, Agent, or Firm* — BakerHostetler

(57) ABSTRACT

A computing device may be configured to receive an audio segment and to determine whether the audio segment comprises one or more classification markers. The classification marker may be encoded in high-frequency sounds. One or more setting may be associated with the classification marker (e.g., objectionable, confusing, traumatic, dangerous, etc.). The computing device may be configured to, based on the one or more settings, perform an action (e.g., suppress the audio segment, provide a visual indicator, customized response, reducing volume, noise cancellation).

21 Claims, 7 Drawing Sheets

(56) References Cited

U.S. PATENT DOCUMENTS

| | | | |
|---|---|---|---|
| 2016/0100208 A1* | 4/2016 | Howcroft | H04N 21/8455 |
| | | | 725/18 |
| 2016/0241912 A1* | 8/2016 | McCarthy | H04H 20/38 |
| 2018/0295422 A1* | 10/2018 | Newell | H04N 21/8133 |
| 2019/0200071 A1* | 6/2019 | Knauer | H04N 21/4622 |
| 2020/0404373 A1* | 12/2020 | Rechner | H04N 21/454 |
| 2022/0148614 A1* | 5/2022 | Block | G10L 15/26 |

\* cited by examiner

SYSTEMS AND METHODS FOR CLASSIFICATION AND DELIVERY OF CONTENT

BACKGROUND

There are a variety of sounds that often occur in audio content that people find objectionable or confusing. For example, a caretaker may find audio content including the sound of a baby crying confusing, a driver may find audio content including an emergency siren confusing, or a military veteran may find audio content including explosions or gunfire upsetting. As another example, a parent may find audio content including profanity objectionable, e.g., when their children are present. Accordingly, a need exists for playback devices or devices near a playback device to automatically discern a nature of sounds included in audio content. Moreover, a need exists for users to customize the behavior of playback devices or devices near a playback device according to a user preference.

SUMMARY

Methods and systems are described for inserting one or more classification markers into a content asset (e.g., based on a classification of the audio content and/or encoded in high frequency sounds) in order to reduce or eliminate confusion or displeasure associated with playback of the content asset. A computing device may be configured to receive a content asset and to determine whether the content asset comprises one or more classification markers. The classification markers may be encoded in high frequency sounds and may alert the computing device to the presence of undesirable content and/or may serve as an indicator or instruction to the computing device to eliminate the undesirable content (e.g., audio filtering) or notify the user of the undesirable content (e.g., a visual or audio signal). The undesirable content may be defined by a user and may comprise audio content that is objectionable, confusing, traumatic, or dangerous. The classification markers may comprise one or more categories of the undesirable content. For example, a data value of the classification marker may comprise one or more bits where first bits may provide basic information (e.g., violent, traffic, vulgar, etc.) and second bits may provide a table reference to identify a specific sound (e.g., handgun fire, train horn, specific swear, etc.). In order to cloak the classification marker, the classification marker may comprise a timestamp associated with the sound and may be inserted in the content asset (e.g., audio segment) during a portion of the content asset associated with other sounds (e.g., music, verbal audio, sound effects, etc.). Moreover, the classification marker may be transmitted on a dedicated audio channel.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described herein for reducing or eliminating undesirable content associated with playback of a content asset at a user device. A user device may be configured to receive a classification marker and the classification marker may cause the user device to output a response based on the received classification marker. The user device may also be configured to receive a selection of the user, where the selection identifies specific sounds or categories of sounds as undesirable content. The user device may identify the undesirable sound based on the received selection and the received classification marker. Moreover, the user device may filter out the undesirable sound based on the classification marker or may notify the user of the undesirable sound.

Figure 1:
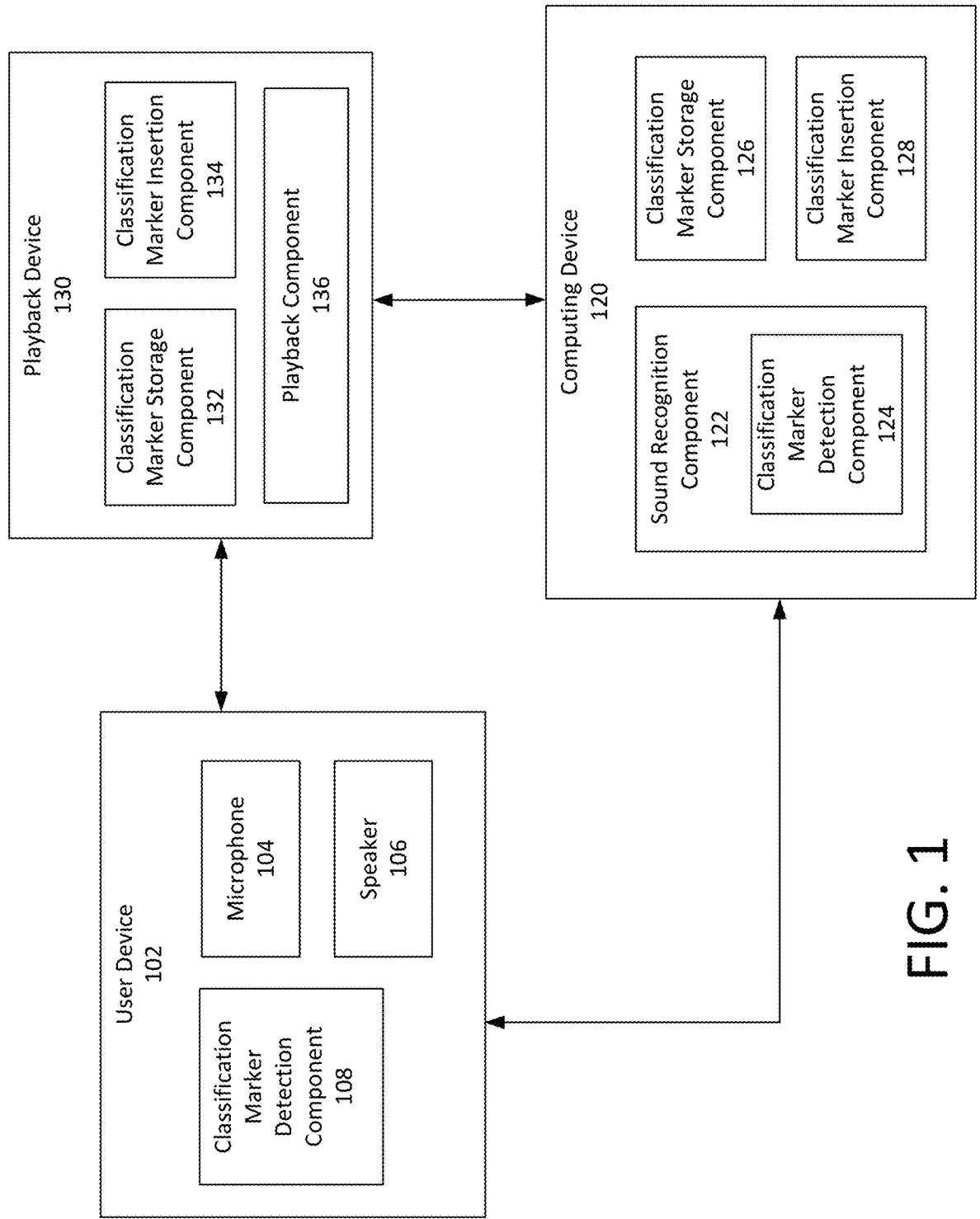
FIG. 1 shows an example system.

FIG. 1 shows an example system in which the methods and apparatus disclosed herein may be implemented. The system 100 may be used to reduce or eliminate undesirable content. A user device 102 may be an audio receiver, a speaker, a handheld device, a computer, etc. The user device 102 may be configured to receive a content asset including a classification marker. The content asset may be received, for example, from a media provider, an audio channel, a microphone input, or a transmitted signal (e.g., wired or wireless). The classification marker may be a predetermined frequency or sound that alerts the user device to the presence of undesirable content following the classification marker, and may serve as an instruction to the user device to perform an operation associated with the classification marker.

The user device 102 may comprise an audio input 104 (e.g., microphone, wired or wireless connection, etc.) and a speaker 106. The audio input 104 may be configured to receive one or more audio signals. A classification marker may be received by the user device 102 through the audio input 104 and may instruct the user device 102 to perform some operation associated with a classification marker. In one example, the audio input 104 may receive an audio signal comprising a classification marker. An audio signal may further comprise one or more classification markers, as discussed herein. The user device 102 (e.g., a car radio or media player device) may include a playback device 130 or the user device 102 may be separate from the playback device 130 (e.g., where the user device 102 is a tablet or smartphone and the playback device 130 is a set-top box).

The classification marker may be an instruction for the playback device 130 to perform audio filtering to cancel, eliminate, or cover up any classified content (e.g., undesirable content) indicated by the classification marker. The classification marker may be received through the audio input 104 (e.g., a microphone or input signal) of a user device 102 (e.g., a tablet or smartphone). The instruction may cause the user device 102 to output a response based on the received classification marker. In an example where audio content includes a sound of a baby crying, a classification marker may comprise a specific category of content (e.g., an identification of "baby crying") and one or more timestamps associated with the sound of baby crying. Upon identification of the classification marker, the playback device 130 may determine to suppress (e.g., cancel) the sound of the baby crying or may notify the user of the user device 102 (e.g., a smartphone) regarding the sound of baby crying (e.g., a visual indication, on-screen cue, audible alert, etc.). Accordingly, the user may avoid any confusion regarding the source of the sound of the baby crying.

The user device 102 may receive one or more user settings. The user settings may comprise an identifier associated with a specific user or a category of to which a specific use belongs. For example, a nanny may be associated with a specific identifier or a nanny may be associated with a childcare category. In either case, it may be automatically determined (e.g., based on a user identifier or a user category) that the nanny or a child care provider may prefer not to hear audio of a baby crying (e.g., to avoid confusion of audio of a baby crying with sounds of a real baby present in the environment).

As another example, the user settings may comprise one or more categories of sounds that the user finds undesirable. As another example, the user settings may comprise a desired response or action as a response to the one or more undesirable categories of sounds or sounds that the user finds undesirable.

The classification marker detection component 108 may be configured to perform recognition processing in order to identify a classification marker. The classification marker detection component 108 may be configured to recognize one or more classification markers received by the device 102 to instruct the user device 102 to take an appropriate action in response to undesirable content. The classification marker detection component 108 may be configured to detect the occurrence of the classification marker, such as a predetermined frequency, series of frequencies, or encoded audio signals. In one example, the user device 102 may be an "always-on" device, and detection of the classification marker may cause the user device 102 to perform an action following the classification marker.

The classification marker detection component 108 may be configured to recognize one or more "Digital Program Insertion Cueing Message for Cable" (SCTE-35) markers or other such markers. An appropriate action may be based at least in part on detection of SCTE 35 or other such markers. For example, an SCTE-35 marker may indicate where a downstream system can insert other content and may be used as a standalone marker or may be used in combination with one or more other classification markers.

The classification marker detection component 108 may be configured to detect the presence of one or more classification markers in an audio signal received at the user device 102. The classification marker may be inserted into a content asset by one of the computing device 120 (e.g., a server) or the playback device 130 (e.g., a set-top box) in response to a determination that the content asset contains undesirable content. Detection of the classification marker by the classification marker detection component 108 may cause the user device 102 (e.g., a smartphone) to perform an action in response to the undesirable content (e.g., providing the user with a visual indicator associated with the classification marker). Detection of the classification marker by the classification marker detection component 108 may cause the playback device (e.g., a receiver or set-top box) to perform an action that corresponds to playback of the content asset by the playback device 130. In one example, the classification marker may be a unique, randomly generated signal marker outside of an audible frequency range, such as a signal marker having a frequency greater than 20 kHz.

In one example, the classification marker detection component 108 may be configured to perform simple pattern matching, as opposed to complex signal processing, in order to detect the occurrence of the classification marker. However, it is understood that the classification marker detection component 108 may be any type of detection component.

The computing device 120 may be configured to insert one or more classification markers into a content asset. The computing device 120 may be, for example, a server configured to store one or more classification markers known to the user device 102 and to insert the one or more classification markers into a content asset. The computing device 120 may comprise a sound recognition component 122. The sound recognition component may comprise, for example, one or more of a speech capture module, a digital signal processor (DSP) module, a preprocessed classification marker storage module, and a reference speech pattern and pattern matching algorithm module. Sound recognition may be done in a variety of ways and at different levels of complexity, for example, using one or more of pattern matching, pattern and feature analysis, and language modeling and statistical analysis. However, it is understood that any type of sound recognition may be used, and the examples provided herein are not intended to limit the capabilities of the sound recognition component 122.

Pattern matching may comprise recognizing each word in its entirety and employing a pattern matching algorithm to match a limited number of words with stored reference speech patterns. An example implementation of pattern matching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated sound recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a sound recognition system in order to improve recognition of words based on different pronunciations.

The sound recognition component 122 may comprise a word detection component 124. The word may be a predetermined word, phrase, or sound in a content asset that, when received at user device, may cause confusion or displeasure associated with the word phrase, or sound. In one example, the sound recognition component 122 may be configured to generate a transcription of a content asset, and the word detection component 124 may be configured to determine whether the transcription contains any known words that may be identified as undesirable.

A content asset may comprise information (e.g., at a head end of the content asset or in an SCTE-35 marker) to identify any classified words or sounds included in the content and a timing associated with the classified words or sounds. Timing information associated with a classified word or sound may be relative to a header or marker, or may be relative to a specific point of time in the content asset (e.g., a beginning, midpoint, endpoint, etc.). For example, instead of or in combination with audio recognition (e.g., by word detection component 12), the the classification marker detection component 124 may detect that a head end of the content asset comprises an SCTE-35 marker including classification information associated with words or sounds included in the content asset and timing information associated with the words or sounds included in the content asset.

The classification marker storage component 126 may receive, from the classification marker detection component 124, an indication that a content asset comprises one or more identified sounds, words, or phrases. In response to receipt of this indication, the classification marker storage component 126 may be configured to generate one or more classification markers for insertion into the content asset. The classification markers may serve as an instruction to the user device 102 to perform an action. The classification markers may be sent to the user device 102 so that the classification markers may be recognized by the user device 102 as an instruction to ignore one or more sounds, words, or phrases in a received audio signal. Additionally or alternatively, the user device 102 may store one or more classification markers known to the classification marker storage component 126.

The classification marker insertion component 128 may be configured to insert one or more classification markers into the content asset. In one example, the classification marker insertion component 128 may be configured to insert a classification marker at a location in the content asset corresponding to a sound, word, or phrase. In another example, in response to receiving an indication of a sound, word, or phrase in the content asset, the classification marker insertion component 128 may be configured to insert a classification marker into the entire content asset or portions of the content asset that comprise a sound, word, or phrase. In an example, the content asset may comprise an offensive word or phrase, e.g., a profanity. The classification marker insertion component 128 may be configured to insert an inaudible classification marker (e.g., a signal marker having a frequency greater than 20 kHz) into the portion of the content asset that contains the offensive word or phrase or to insert the inaudible classification marker throughout a portion of the content asset, e.g., prior to the offensive word or phrase.

The playback device 130 (e.g., a set-top box or receiver) may receive, from the computing device 120 (e.g., a server or media transmitter), a content asset such as a television asset or an advertising asset. The content asset may be received with or without one or more classification markers inserted in the content asset corresponding to a location of one or more sounds, words, or phrases in the content asset. The playback device 130 (e.g., a set-top box or receiver) may be configured to insert one or more classification markers into the content asset corresponding to a location of one or more sounds, words, or phrases in the content asset such that the user device 102 may perform an action (e.g., display a visual indicator to a user via a display of the user device 102) when the content asset is played back by the playback device 130 (e.g., via a speaker of the playback device 130). In one example, the classification marker storage component may receive, from the computing device 120, a transcription of a content asset, and may determine that the transcription of the content asset contains one or more sounds, words, or phrases.

The classification marker storage component 132 may be configured to receive an indication that one or more sounds, words, or phrases have been detected at a location in a content asset. Additionally or alternatively, the classification marker storage component 132 may receive the transcription of the content asset and may determine a location of one or more sounds, words, or phrases in the content asset. The classification marker storage component 132 may be configured to generate one or more classification markers for insertion into the content asset. The classification marker storage component 132 may send the one or more classification markers to the user device 102. The classification markers may serve as an instruction to the user device 102 to perform an action in connection with a detected sound, word, or phrase.

The classification marker insertion component 134 may be configured to insert one or more classification markers into the content asset. In one example, the classification marker insertion component 134 may be configured to insert a classification marker at a location in the content asset corresponding to a sound, word, or phrase. In another example, in response to receiving an indication of a sound, word, or phrase in the content asset, the classification marker insertion component 134 may be configured to insert a classification marker into the entire content asset or portions of the content asset that comprise a sound, word, or phrase.

For example, an audio receiver (e.g., playback device 130) may receive a streaming audio content from a media server (e.g., computing device 120). The streaming audio content may include one or more classification markers and the audio receiver (e.g., playback device 130) may filter the received audio content based on the one or more classification markers. For example, the audio receiver (e.g., playback device 130) may mute or filter out content associated with the one or more classification markers. Moreover, the audio receiver (e.g., playback device 130) may insert one or more classification markers into the audio content corresponding to a location of one or more sounds, words, or phrases in the content asset. A user device 102, such as a smartphone, may perform an action based on the inserted classification markers. For example, a smartphone (e.g., user device 102) may display a text to the user associated with the classification markers (e.g., category of marker, specifics regarding the classified content, etc.).

Figure 2:
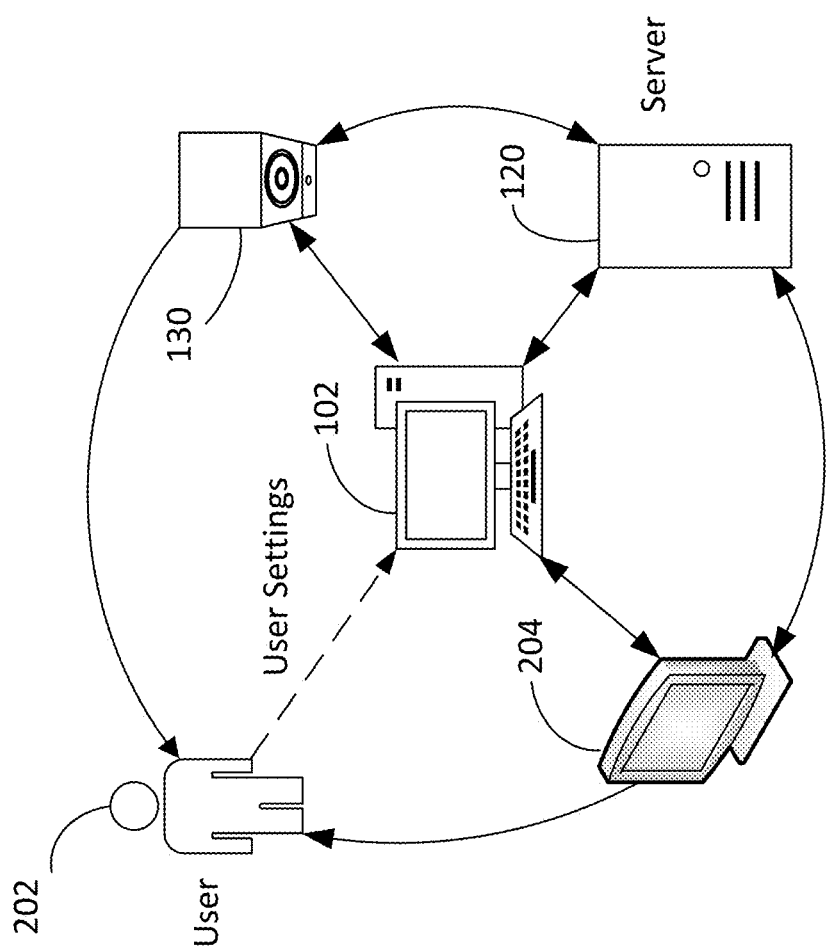
FIG. 2 shows an example event associated with objectionable content.

FIG. 2 shows an example event (e.g., playback of a content asset comprising objectionable content) in which the methods and apparatus disclosed herein may be implemented. A user device 102 may be configured to receive one or more settings from a user 202 regarding audio associated with one or more content assets. The settings may comprise an identifier associated with a specific user or a category of to which a specific use belongs. For example, a nanny may be associated with a specific identifier or a nanny may be associated with a childcare category. In either case, it may be automatically determined (e.g., based on a user identifier or a user category) that the nanny or a child care provider may prefer not to hear audio of a baby crying (e.g., to avoid confusion of audio of a baby crying with sounds of a real baby present in the environment).

For example, the one or more settings may comprise words, sounds, or categories of content the user finds objectionable, confusing, traumatic, dangerous, etc. Moreover, the one or more settings may comprise one or more desired actions to be taken in response to the one or more words, sounds, or categories of content. For example, the one or more desired actions may include providing a visual indicator associated with a type of a classification marker. As another example, the one or more desired actions may include suppressing an audio segment or suppressing a typical response to a classification marker.

User device 102 may be configured to receive an audio signal (e.g., an audio signal associated with a content asset) comprising a classification marker and content associated with the classification marker. User device 102 may receive an audio signal via wired or wireless transmission. In some examples, user device may receive an audio signal from speaker 130, e.g., via an audio microphone.

The audio signal may be associated with a content asset. The content asset may be stored locally or may be transmitted by a content server (e.g., computing device 120). The content asset may be received by the user device 102 from the computing device 120 directly. In some examples, the audio signal may be received from the computing device 120 by a device associated with speaker 130.

Detection of the classification marker may cause the user device 102 to perform an action based on the type of the classification marker. Moreover, the action may be based on a determination of a type of the classification marker For example, the user device 102 may filter the content, e.g., reducing volume or eliminating any unwanted content associated with the classification marker. In some examples, the user device 102 may provide a visual indication of content (e.g., via display 204) that a user may find confusing or objectionable. For example, the user 202 may indicate (e.g., via one or more user settings) a desire for a visual alert when content comprises a sound of a baby crying. Upon receiving content including a sound of a baby crying, the user device 102 may notify the user 202 of the sound of a baby crying. Accordingly, the user 102 may avoid any confusion that the sound was from the user's own baby.

User device 102 and/or speaker 130 may be associated with a playback device such as a set-top box connected to a television set. Moreover, the user device 102, speaker 130, and/or display 204 may consist of a single device or multiple devices in any combination. For example, a television set may be configured to playback a content asset, such as an advertisement, television show or movie received at or stored by the set-top box. The content asset being played back by the television set may comprise a classification marker. For example, the content asset may be a movie and may comprise an audio signal with gunfire. The user device 102 may receive this audio signal from the television set, verify the presence of the classification marker and the corresponding user setting, and may notify or warn the user 202 regarding the content.

Figure 3:
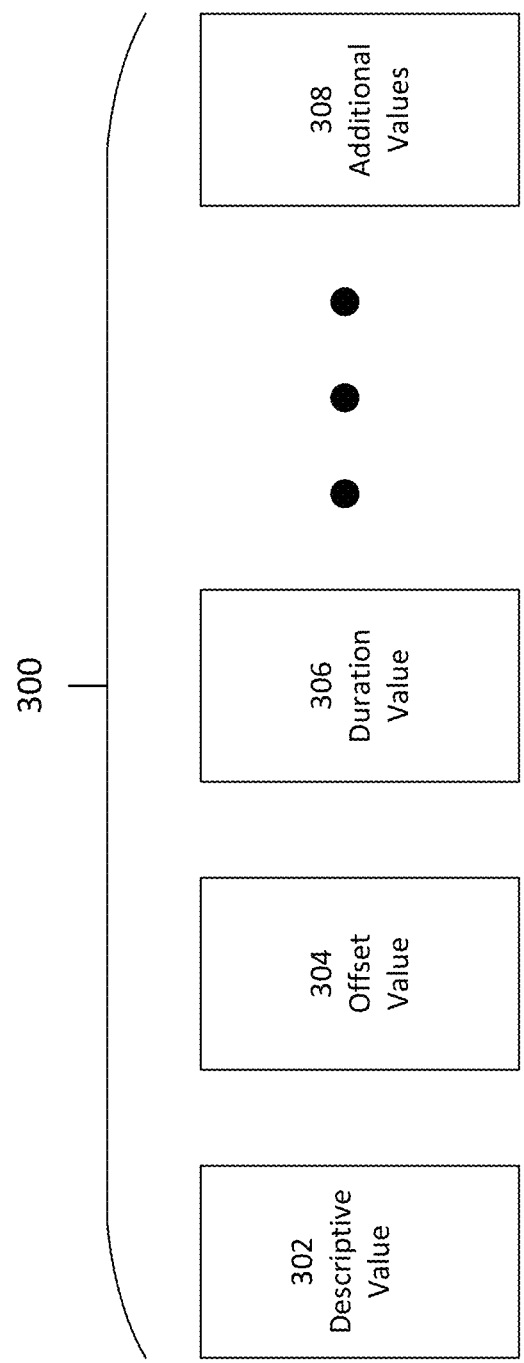
FIG. 3 shows an example marker associated with objectionable content.

FIG. 3 shows an example classification marker 300 associated with objectionable content. Classification marker 300 may be encoded in high-frequency sounds added to an audio track. These sounds may be inaudible to a large majority of adults with normal hearing. For example, the high frequency sounds may be at 17-20 kHz. Moreover, the high-frequency sounds may be tuned to be inaudible to humans based on any number of factors, including features of a playback system, available speakers, and/or quality of microphones. Encoding mechanisms may comprise amplitude and/or frequency modulation and may have different qualities in terms of available data bandwidth available and/or durability of data in the presence of outside noise. Granularity of individual sounds (e.g., objectionable content) or frequency of classification markers may be based on available bandwidth. Moreover, certain kinds of sounds may be classified manually or automatically (e.g., by machine learning).

Each classified sound may have a start and end time. To allow devices to receive, decode, and take action on a sound, classification markers (e.g., classification marker 300) may generally appear in audio shortly before the sound actually plays. Due to challenges for live broadcasts, audio buffers and broadcast delays may allow systems to retroactively add a classification marker in a buffer before a listener hear a sound.

As shown in FIG. 3, an exemplary classification marker 300 may comprise multiple components. For example, a descriptive value 302 may describe the sound (e.g., child crying, gunshot, explosion, swear word, traffic accident, and so on). Moreover, the descriptive value 302 may comprise one or more levels of classification. For example, a first level of classification (e.g., first few bits of descriptive value 302) may provide only very basic information: violent, traffic, vulgar, or other, for example. One or more further levels of classification may further describe the sound (e.g., specific category or description of expletive, vehicle sirens, explosions, etc.).

A classification marker 300 may comprise a dictionary (e.g., additional values 308) that provide shortcuts to more information. For example, descriptive value 302 may comprise one or more bits which provide a reference into a table that describes a classification of the sound: handgun fire, train horn, specific swear word, and so on. Moreover, the table may be transmitted periodically during sections of the content when the channel is available. Classification markers may be shifted in order to increase availability. A system that "misses" the dictionary or tunes in after the most recent transmission time may not have detailed classification information, but may still act on basic information. Moreover, a data value (e.g., descriptive value 302 or additional values 308) of classification marker 300 may be determined based on a composition or interpretation of one or more other classification markers (e.g., in combination, in sequence, etc.). For example, a first classification marker may provide data used to interpret one or more subsequent classification markers.

An offset value 304 may indicate a time of the classified sound based on a time offset. For example, offset value 304 may be relative to a time point (e.g., a start of the classification marker, a beginning of a playback, or a designated point in time) and may indicate a time (e.g., an absolute time or a time relative to another point in time) of the classified sound. A duration value 306 may indication a duration of the classified sound. For example, offset value 304 may comprise a time relative to the classification marker or relative to a fixed point in time when a stream is continuous (e.g., live video).

Encoding and other details of the transmission environment may limit accuracy with which the offset value 304 and/or duration value 306 may be specified. For example, systems operating with fidelity higher than tenths of a second may sufficiently indicate timing aspects of the classified sound.

Classifying sounds ahead of time may allow encoders to "hide" the high-frequency sound of classification marker 300 in other sounds where possible, e.g., reducing the risk of classification marker 300 appearing during otherwise silent portions of audio where it might be noticed by people with exceptionally good hearing. Likewise, bandwidth limits (e.g., on a classified sound channel) may limit a level of description of a sound, e.g., including a number of classifiers and/or level of detail of classification.

In multi-channel audio systems, a classified audio channel may be provided (e.g., similarly to alternate language content). For example, in digital systems, classified audio data may be provided in an alternate mechanism entirely and synthesized for the playback device. Likewise, a playback device may detect and remove classified audio data from a channel (e.g., after acting on it) in order to improve listening for listeners with very good hearing. Classified audio may be used in conjunction with captioning systems to add visual cues for classified sounds. Hearing aids may be configured to handle different kinds of classified audio according to the preferences of the hearer.

Figure 4:
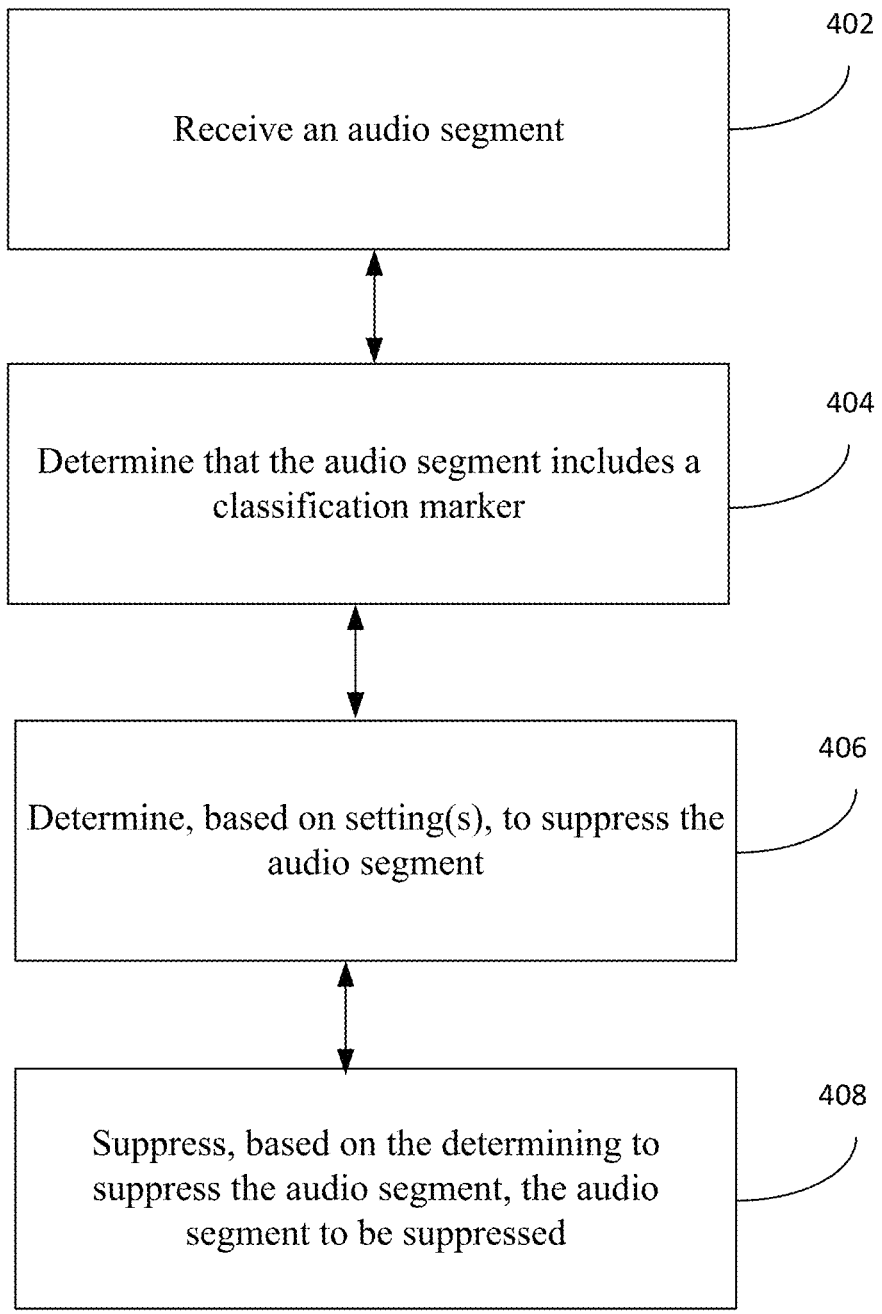
FIG. 4 shows an example method.

FIG. 4 shows an example method 400. At step 402, an audio segment may be received. The audio segment may be received, for example, by the user device 102 shown in FIG. 1. The audio segment may be a movie asset, a television asset, a live broadcast asset such as a sporting event, an audio asset such as music streaming, a Video on Demand (VOD) asset, or an advertising asset such as a commercial break in a television asset. However, it is understood that the content asset may be any type of content asset having any length or duration. The content asset may be received from a service provider, such as a service provider configured to distribute movie and television assets to one or more subscribers of the service provider.

At step 404, it may be determined that the audio segment comprises a classification marker. A classification marker may be encoded in high-frequency sounds (e.g., frequency greater than 20,000 Hz) added to the audio segment and may generally appear in the audio segment shortly before a sound associated with the classification marker plays. The classification marker may be undetectable by a user of the user device 102 but within a detectable range of the user device 102.

The user device 102 may comprise a microphone, such as the microphone 104 shown in FIG. 1. In one example, the user device 102 may comprise a plurality of microphones. At least one of the microphones may be configured for the detection of one or more classification markers in the audio signal, e.g., classification markers in the audio segment having a frequency greater or less than a given threshold. For example, the microphones configured for detection of the classification markers may be configured to detect a classification marker having a frequency greater than 20,000 Hz. Thus, the microphone may detect the presence of a classification marker in the audio segment based on the frequency of the classification marker.

A type of the classification marker may be determined, e.g., based on the classification marker. For example, the classification marker may comprise multiple components. For example, a descriptive value may describe a sound associated with the classification marker (e.g., child crying, gunshot, explosion, swear word, traffic accident, and so on). Moreover, the descriptive value may comprise one or more levels of classification. For example, a first level of classification may provide only very basic information: violent, traffic, vulgar, or other, for example. One or more further levels of classification may further describe the sound (e.g., specific category or description of expletive, vehicle sirens, explosions, etc.). An offset value may indicate a time of the classified sound based on a time offset. For example, the offset value may be relative to a time point at a start of the classification marker and may indicate a time of the classified sound. A duration value may indication a duration of the classified sound.

At step 406, one or more actions may be determined based on one or more settings associated with the classification marker (e.g., suppressing the audio segment). The one or more settings (e.g., user defined settings of device 102) may be used to determine a type of a user or an action based on the type of the classification marker. For example, a typical response to the audio segment may be suppressed based on one or more settings associated with the user or the classification marker. For example, processing the classification marker may comprise determining a type of the user and that the sound associated with the classification marker, based on the determined type of the user, should be canceled out (e.g., filtered or minimized) or that a visual signal associated with the classification marker and/or the sound associated with the classification marker should be provided. Processing the classification marker may comprise comparing the classification marker to a plurality of stored classification markers. The user device 102 may be configured to store one or more classification markers that may be generated by one of the computing device 120 or the playback device 130. The computing device 120 or the playback device 130 may be configured to insert the one or more classification markers known to the user device 102 into a content asset in order to instruct the user device 102 to perform an action when the content asset is played back by the playback device 130. In one example, different classification markers may be used to instruct the user device 102 to perform different commands.

At step 408, the audio segment may be suppressed based on the determining to suppress the audio segment (e.g., step 406). Moreover, a typical response to the audio segment may be suppressed based on a type of the classification marker. For example, the type of classification marker (e.g., in combination with or in relation to a type of the user) may indicate that one or more sounds associated with the classification marker should be canceled out (e.g., filtered or minimized) and/or that a visual signal associated with the classification marker should be changed, altered, or canceled.

Figure 5:
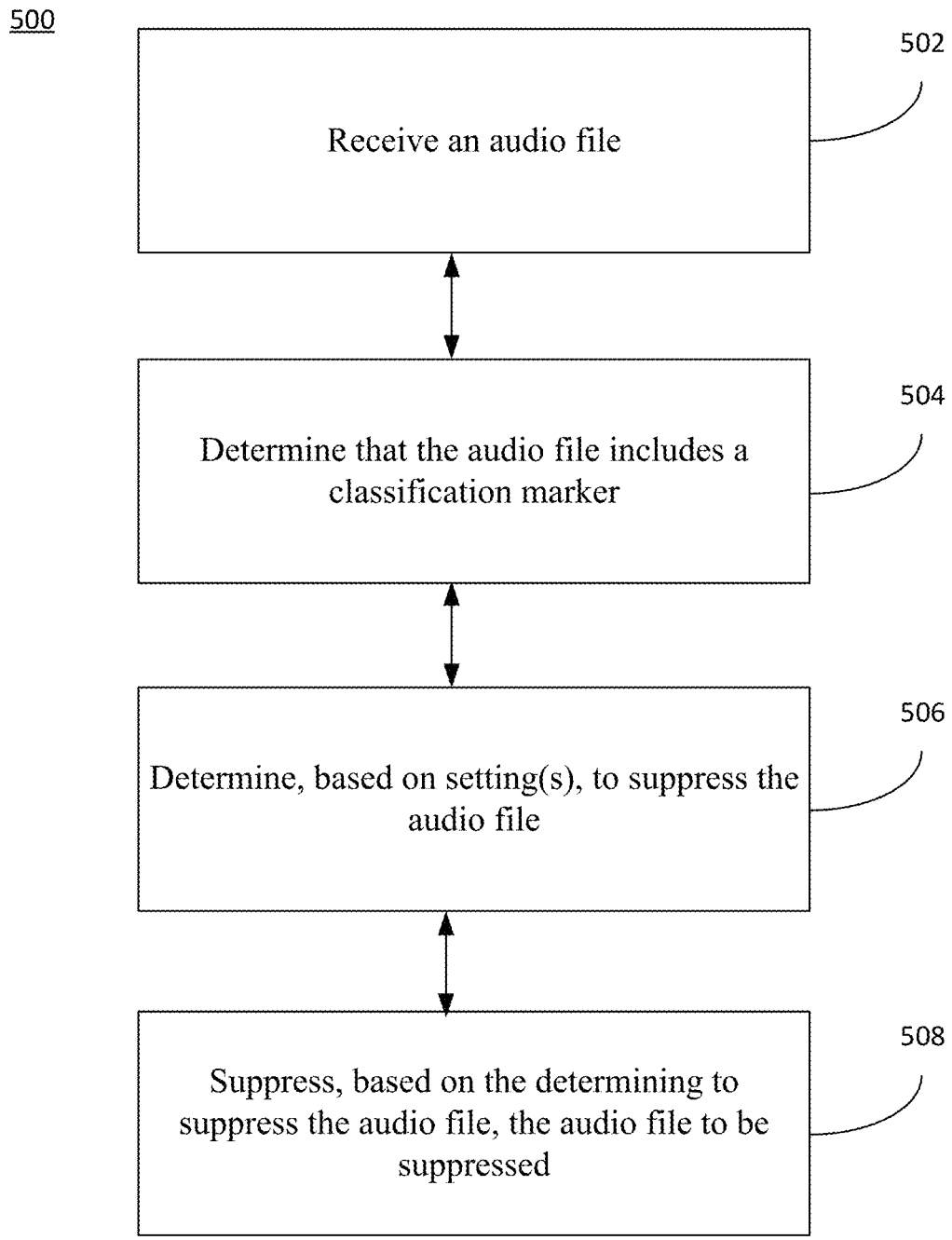
FIG. 5 shows an example method.

FIG. 5 shows an example method 500. At step 502, an audio file may be received. The audio file may be received, for example, by the server 120 or playback device 130 shown in FIG. 1. The audio file may be a movie asset, a television asset, a live broadcast asset such as a sporting event, an audio asset such as music streaming, a Video on Demand (VOD) asset, or an advertising asset such as a commercial break in a television asset. However, it is understood that the content asset may be any type of content asset having any length or duration. The content asset may be received from a service provider, such as a service provider configured to distribute movie and television assets to one or more subscribers of the service provider.

At step 504, it may be determined that the audio file comprises a classification marker. A classification marker may be encoded in high-frequency sounds (e.g., frequency greater than 20,000 Hz) added to the audio segment and may generally appear in the audio segment shortly before a sound associated with the classification marker plays. The classification marker may be undetectable by a user of the user device but within a detectable range of the user device.

A type of the classification marker may be determined, e.g., based on the classification marker. For example, the classification marker may comprise multiple components. For example, a descriptive value may describe a sound associated with the classification marker (e.g., child crying, gunshot, explosion, swear word, traffic accident, and so on). Moreover, the descriptive value may comprise one or more levels of classification. For example, a first level of classification may provide only very basic information: violent, traffic, vulgar, or other, for example. One or more further levels of classification may further describe the sound (e.g., specific category or description of expletive, vehicle sirens, explosions, etc.). An offset value may indicate a time of the classified sound based on a time offset. For example, the offset value may be relative to a time point at a start of the classification marker and may indicate a time of the classified sound. A duration value may indication a duration of the classified sound.

At step 506, one or more actions may be determined based on one or more settings associated with the classification marker (e.g., suppressing the audio file). the audio file may be processed based on the type of the classification marker. For example, a typical response to the audio file may be suppressed based on one or more settings associated with the user or the classification marker. For example, processing the classification marker may comprise determining that the sound associated with the classification marker should be canceled out (e.g., filtered or minimized) or that a visual signal associated with the classification marker and/or the sound associated with the classification marker should be provided. Processing the classification marker may comprise comparing the classification marker to a plurality of stored classification markers. For example, server 120 or playback device 130 may be configured to store one or more classification markers. The server 120 or playback device 130 may be configured to insert the one or more classification markers into the audio file in order to instruct a user device to perform an action when the audio file is played back by a playback device. In one example, different classification markers may be used to instruct the user device to perform different commands.

At step 508, the audio file may be suppressed based on the determining to suppress the audio file (e.g., step 506). Moreover, a typical response to the audio file may be suppressed based on the type of the classification marker. For example, the type of classification marker (e.g., in combination with or in relation to a type of the user) may indicate that one or more sounds associated with the classification marker should be canceled out (e.g., filtered or minimized) and/or that a visual signal is associated with the classification marker should be changed, altered, or canceled.

Figure 6:
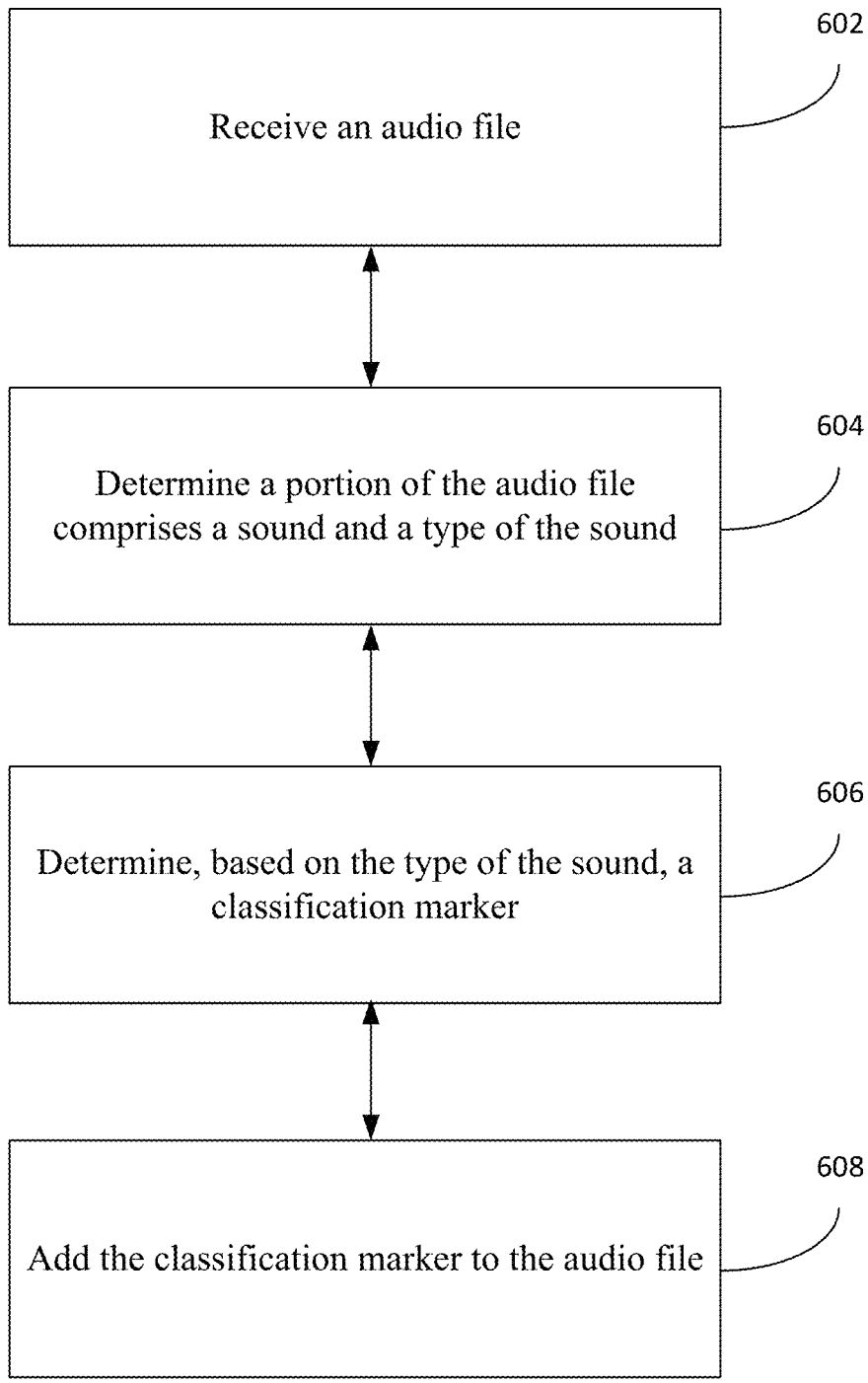
FIG. 6 shows an example method.

FIG. 6 shows an example method 600. At step 602, an audio file may be received. The audio file may be received, for example, by the server 120 or playback device 130 shown in FIG. 1. The audio file may be a movie asset, a television asset, a live broadcast asset such as a sporting event, an audio asset such as music streaming, a Video on Demand (VOD) asset, or an advertising asset such as a commercial break in a television asset. However, it is understood that the content asset may be any type of content asset having any length or duration. The content asset may be received from a service provider, such as a service provider configured to distribute movie and television assets to one or more subscribers of the service provider.

At step 604, it may be determined that a portion of the audio file includes a sound. For example, a portion of the audio file may be compared to a stored audio clip. A type of the sound may further be determined at step 604. For example, the sound may be loud or may belong to one or more categories that have been previously identified by a user. At step 606, a classification marker may be determined based on the type of the sound. At step 608, based on the type of the sound, the classification marker may be added to the audio file. The classification marker may be encoded in high-frequency sounds added to the audio file and may generally appear in the audio file shortly before a sound associated with the classification marker. The classification marker may be undetectable by a user of the user device but within a detectable range of the user device.

For example, the classification marker may comprise multiple components. For example, a descriptive value may describe a sound associated with the classification marker (e.g., child crying, gunshot, explosion, swear word, traffic accident, and so on). Moreover, the descriptive value may comprise one or more levels of classification. For example, a first level of classification may provide only very basic information: violent, traffic, vulgar, or other, for example. One or more further levels of classification may further describe the sound (e.g., specific category or description of expletive, vehicle sirens, explosions, etc.). An offset value may indicate a time of the classified sound based on a time offset. For example, the offset value may be relative to a time point at a start of the classification marker and may indicate a time of the classified sound. A duration value may indication a duration of the classified sound.

Figure 7:
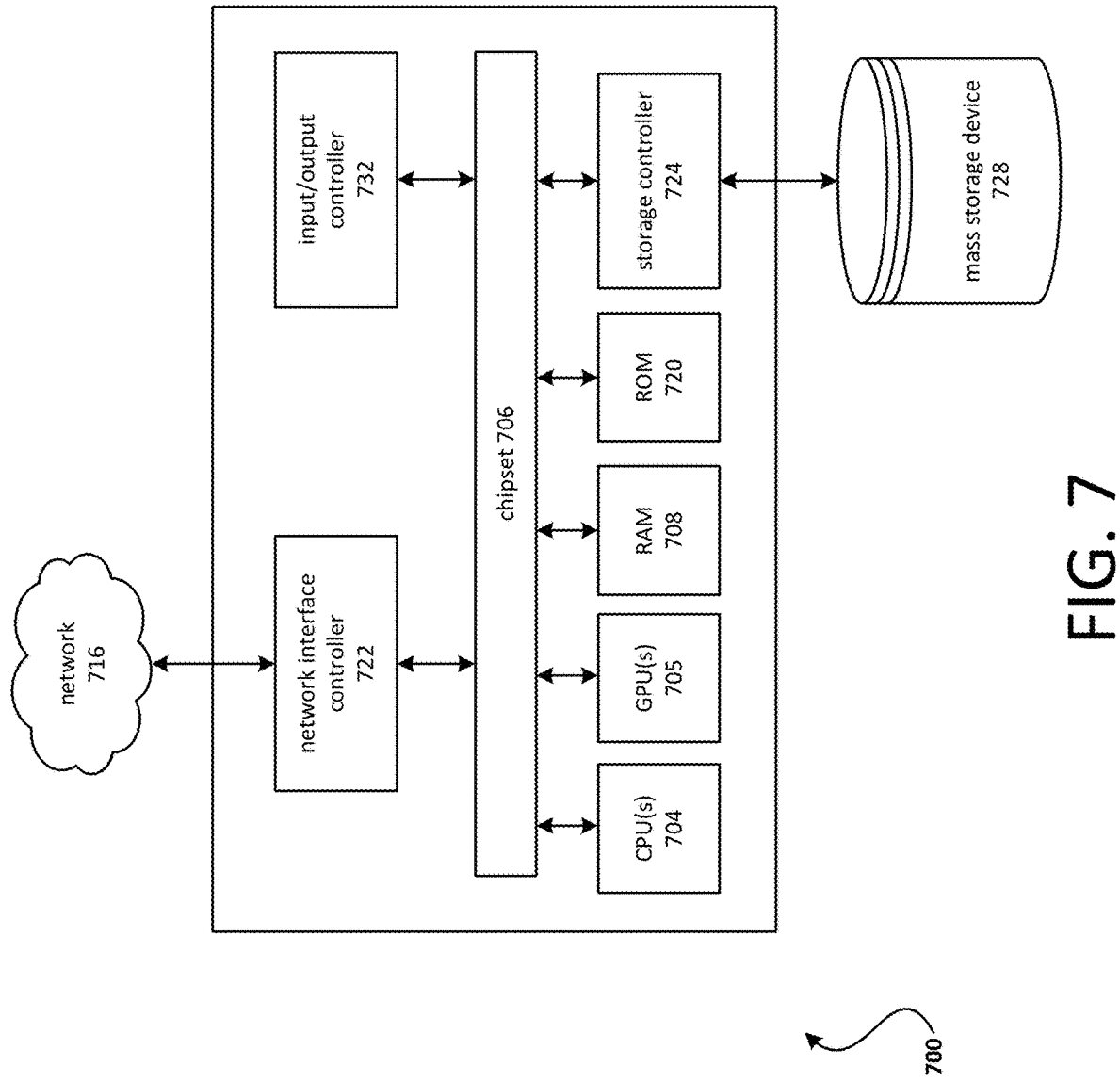
FIG. 7 shows an example computing device.

FIG. 7 shows a computing device that may be used in various examples, such as the servers, modules, and/or devices depicted in FIGS. 1 and 2. With regard to the example architecture of FIG. 1, the user device 102, computing device 120, and/or the playback device 130 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-6.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the examples described herein.

The computing device 700 may operate in a networked environment using logical connections to remote computing nodes and computer systems through local area network (LAN) 716. The chipset 706 may comprise functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may comprise volatile and non-volatile, transitory computer-readable storage media and non-transitory computer-readable storage media, and removable and non-removable media implemented in any method or technology. Computer-readable storage media comprises, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 shown in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional examples, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the examples described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3-6.

A computing device, such as the computing device 700 shown in FIG. 7, may also comprise an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not comprise all of the components shown in FIG. 7, may comprise other components that are not explicitly shown in FIG. 7, or may utilize an architecture completely different than that shown in FIG. 7.

As described herein, a computing device may be a physical computing device, such as the computing device 700 of FIG. 7. A computing node may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, it will be understood another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all examples of this application including, but not limited to, operations in described methods. Thus, if there are a variety of additional operations that may be performed it is understood that each of these additional operations may be performed with any specific example or combination of examples of the described methods.

The present methods and systems may be understood more readily by reference to the following detailed description of the examples included therein and to the Figures and their descriptions.

As will be appreciated by one skilled in the art, the methods and systems may take the form of an entirely hardware example, an entirely software example, or an example combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described examples. The example systems and components described herein may be configured differently than described. For example, elements may be added to, removed from, or rearranged compared to the described examples.

It will also be appreciated that various items are illustrated as being stored in memory or on storage while being used, and that these items or portions thereof may be transferred between memory and other storage devices for purposes of memory management and data integrity. Alternatively, in other examples, some or all of the software modules and/or systems may execute in memory on another device and communicate with the illustrated computing systems via inter-computer communication. Furthermore, in some examples, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

While the methods and systems have been described in connection with specific examples, it is not intended that the scope be limited to the particular examples set forth, as the examples herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of examples described in the specification.

It will be apparent to those skilled in the art that various modifications and variations may be made without departing from the scope or spirit of the present disclosure. Embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    receiving, by a microphone of a computing device located in an environment, audio output by a playback device;
    determining that the audio comprises a classification marker encoded into one or more sounds of the audio, wherein the classification marker comprises a notification that a portion of the audio comprises a classified sound;
    determining, based on the notification that the portion of the audio comprises the classified sound and a user setting associated with the classified sound and made prior to receiving the audio, a likelihood that the portion of the audio comprising the classified sound will cause user confusion in the environment; and
    providing, by the computing device, an indication of the classified sound to reduce the likelihood of the user confusion in the environment.

2. The method of claim 1, wherein the classification marker comprises:
    a data value indicative of a nature of the classified sound;
    a time value indicating a time of the classified sound within the audio; and
    a duration value indicating a duration of the classified sound within the audio.

3. The method of claim 2, wherein the data value of the classification marker comprises one or more categories of the classified sound.

4. The method of claim 1, wherein a type of the classification marker is determined based on received data and the determining the likelihood that the portion of the audio comprising the classified sound will cause user confusion in the environment is further based on the type of the classification marker.

5. The method of claim 1, wherein the classification marker is encoded in one or more high frequency sounds.

6. The method of claim 1, wherein the indication of the classified sound comprises a visual indicator.

7. The method of claim 1, wherein the user setting associated with the classified sound and made prior to receiving the audio comprises one or more of:
    an indication that a user of the computing device is likely to be confused by the classified sound; or
    an indication that a user of the computing device belongs to a category of user that is likely to be confused by the classified sound.

8. A device located in an environment, the device comprising:
    one or more processors; and
    memory storing instructions that, when executed by the one or more processors, cause the device to:
    receive, by a microphone, audio output by a playback device;
    determine that the audio comprises a classification marker encoded into one or more sounds of the audio, wherein the classification marker comprises a notification that a portion of the audio comprises a classified sound;
    determine, based on the notification that the portion of the audio comprises the classified sound and a user setting associated with the classified sound and made prior to receiving the audio, a likelihood that the portion of the audio comprising the classified sound will cause user confusion in the environment; and
    provide an indication of the classified sound to reduce the likelihood of the user confusion in the environment.

9. The device of claim 8, wherein the classification marker comprises:
    a data value indicative of a nature of the classified sound;
    a time value indicating a time of the classified sound within the audio; and
    a duration value indicating a duration of the classified sound within the audio.

10. The device of claim 9, wherein the data value of the classification marker comprises one or more categories of the classified sound.

11. The device of claim 8, wherein a type of the classification marker is determined based on received data and the determining the likelihood that the portion of the audio comprising the classified sound will cause user confusion in the environment is further based on the type of the classification marker.

12. The device of claim 8, wherein the classification marker is encoded in one or more high frequency sounds.

13. The device of claim 8, wherein the indication of the classified sound comprises a visual indicator.

14. The device of claim 8, wherein the user setting associated with the classified sound and made prior to receiving the audio comprises one or more of:
    an indication that a user of the device is likely to be confused by the classified sound; or an indication that a user of the device belongs to a category of user that is likely to be confused by the classified sound.

15. A non-transitory computer-readable medium storing computer-executable instructions that, when executed by one or more processors, cause:
receiving, by a microphone of a device located in an environment, audio output by a playback device;
determining, by the device, that the audio comprises a classification marker encoded into one or more sounds of the audio, wherein the classification marker comprises a notification that a portion of the audio comprises a classified sound;
determining, by the device, based on the notification that the portion of the audio comprises the classified sound and a user setting associated with the classified sound and made prior to receiving the audio, a likelihood that the portion of the audio comprising the classified sound will cause user confusion in the environment; and
providing, by the device, an indication of the classified sound to reduce the likelihood of the user confusion in the environment.

16. The non-transitory computer-readable medium of claim 15, wherein the classification marker comprises:
a data value indicative of a nature of the classified sound;
a time value indicating a time of the classified sound within the audio; and
a duration value indicating a duration of the classified sound within the audio.

17. The non-transitory computer-readable medium of claim 16, wherein the data value of the classification marker comprises one or more categories of the classified sound.

18. The non-transitory computer-readable medium of claim 15, wherein the classification marker is encoded in one or more high frequency sounds.

19. The non-transitory computer-readable medium of claim 15, wherein the classification marker comprises an inaudible signal marker.

20. The non-transitory computer-readable medium of claim 15, wherein the indication of the classified sound comprises a visual indicator.

21. The non-transitory computer-readable medium of claim 15, wherein the user setting associated with the classified sound and made prior to receiving the audio comprises one or more of:
an indication that a user of the device is likely to be confused by the classified sound; or
an indication that a user of the device belongs to a category of user that is likely to be confused by the classified sound.

* * * * *